United States Patent
Lin et al.

(10) Patent No.: US 6,760,235 B2
(45) Date of Patent: Jul. 6, 2004

(54) SOFT START FOR A SYNCHRONOUS RECTIFIER IN A POWER CONVERTER

(75) Inventors: Feng Lin, Plano, TX (US); Ning Sun, Plano, TX (US); Hengchun Mao, Plano, TX (US); Yimin Jiang, Plano, TX (US)

(73) Assignee: Netpower Technologies, Inc., Plano, TX (US)

( * ) Notice: Subject to any disclaimer, the term of this patent is extended or adjusted under 35 U.S.C. 154(b) by 0 days.

(21) Appl. No.: 10/241,336

(22) Filed: Sep. 11, 2002

(65) Prior Publication Data

US 2003/0048643 A1 Mar. 13, 2003

Related U.S. Application Data

(60) Provisional application No. 60/318,795, filed on Sep. 13, 2001.

(51) Int. Cl.[7] ............................................. H02M 3/335
(52) U.S. Cl. ...................... 363/21.06; 363/49
(58) Field of Search ................... 363/21.06, 21.14, 363/84, 127, 49

(56) References Cited

U.S. PATENT DOCUMENTS

| | | | |
|---|---|---|---|
| 5,303,138 A | | 4/1994 | Rozman |
| 5,521,809 A | | 5/1996 | Ashley et al. |
| 5,631,810 A | | 5/1997 | Takano |
| 5,708,571 A | * | 1/1998 | Shinada ........................ 363/16 |
| 5,724,235 A | * | 3/1998 | Shimamori et al. ...... 363/21.06 |
| 5,734,563 A | * | 3/1998 | Shinada ..................... 363/21.06 |
| 5,920,475 A | * | 7/1999 | Boylan et al. ............... 363/127 |
| 5,940,287 A | | 8/1999 | Brkovic |
| 5,952,733 A | | 9/1999 | Johnston |
| 6,061,255 A | * | 5/2000 | Chik et al. ................ 363/21.06 |
| 6,137,274 A | | 10/2000 | Rajagopalan |
| 6,185,082 B1 | | 2/2001 | Yang |
| 6,188,592 B1 | | 2/2001 | Farrington et al. |
| 6,191,964 B1 | | 2/2001 | Boylan et al. |
| 6,195,275 B1 | | 2/2001 | Lu |
| 6,252,781 B1 | * | 6/2001 | Rinne et al. ................... 363/16 |
| 6,271,712 B1 | | 8/2001 | Ball |
| 6,344,980 B1 | | 2/2002 | Hwang et al. |
| 6,418,039 B2 | * | 7/2002 | Lentini et al. ............ 363/21.06 |
| 6,426,612 B1 | | 7/2002 | Rozsypal |
| 6,429,709 B1 | | 8/2002 | Hall et al. |
| 6,618,274 B2 | * | 9/2003 | Boylan et al. ................. 363/17 |
| 2003/0128556 A1 | * | 7/2003 | Zhang ........................ 363/21.06 |

* cited by examiner

*Primary Examiner*—Shawn Riley
(74) *Attorney, Agent, or Firm*—Christine Q. McLeod; Beusse Brownlee Wolter Mora & Maire

(57) ABSTRACT

Circuit and method for controlling circuitry in a power converter device during a soft-start process is provided. Synchronous rectifier control circuitry is adapted to gradually apply a gate drive signal derived from the main switch of the power converter device to a freewheeling synchronous rectifier of the switching circuitry during the soft-start process. The control circuitry gradually releases the amplitude or the pulse-width of the gate drive signal to the freewheeling synchronous rectifier to avoid a large duty ratio in the synchronous rectifier during start-up so that a negative current does not build up in the output inductor.

24 Claims, 5 Drawing Sheets

SOFT START FOR A SYNCHRONOUS RECTIFIER IN A POWER CONVERTER

This application claims the benefit of U.S. Patent Application serial No. 60/318,795 filed on Sep. 13, 2001, incorporated herein by reference.

BACKGROUND OF THE INVENTION

The present invention is generally related to control and operation of power converter devices, and, more particularly, to circuits and techniques that improve the startup performance of power converters using synchronous rectifiers.

DC/DC power converter devices are widely used in numerous applications, such as telecommunications and networking applications. A dc/dc converter is an electronics device that converts a raw dc (direct current) voltage input, usually with a certain variation range, to a dc voltage output that meets a set of specifications. With fast-growing technologies used in telecommunications equipment, the demands on the power density and conversion efficiency of dc/dc converters continue to increase. The converter typically includes a transformer, having primary and secondary windings wound around a common magnetic core. By opening and closing the main power switches for appropriate intervals, control over the energy transfer between the input and output is accomplished. The transformer provides an alternating voltage whose amplitude can be adjusted by changing the number of turns of the primary and secondary windings. Moreover, the transformer provides DC isolation between the input and the output of the converter. However, a transformer is not required in a non-isolated converter.

One of the most common DC/DC converter topologies is the forward converter. When the primary winding of the forward converter is energized by closing the primary switch, energy is immediately transferred to the secondary winding. Synchronous rectifier circuits are used in forward converters, as well as in flyback converters, buck converters, push-pull converters, and half-bridge converters, among others. In switching power supply circuits employing synchronous rectifiers, the diodes are replaced by power transistors to obtain a lower on-state voltage drop. The synchronous rectifier generally uses n-channel MOSFETs rather than diodes to avoid the turn on voltage drop of diodes that can be significant for low output voltage power supplies. The transistors are biased to conduct from source-to-drain (for an n-channel power MOSFET) when a diode would have been conducting from anode to cathode, and conversely, are gated to block voltage from drain-to-source when a diode would have been blocking from cathode to anode. Although MOSFETs usually serve this purpose, bipolar transistors and other semiconductor switches as also suitable.

In these synchronous rectifier circuits, the gate signals can be self-driven, i.e., the gate signal can be tied directly to the power circuit, or controlled-driven, i.e., the gate signal is derived from some point in the circuit and goes through some processing circuit before being fed to the MOSFET gate driver. In a power converter, the synchronous rectifier which conducts during the non-conducting period of the main power switch(switches) is called a freewheeling synchronous rectifier. The gate drive signal to a freewheeling synchronous rectifier plays a very important role in the startup process of a converter.

FIG. 1 shows conventional synchronous rectifiers in a forward converter 10. In this example, a DC voltage input Vin is connected to the primary winding of the power transformer by a MOSFET power switch Q1. A clamp circuit arrangement is also provided to limit the reset voltage. The MOSFET power switch Q1 is shunted by a series connection of a clamp capacitor Creset and a MOSFET switch device Q2. The conducting intervals of Q1 and Q2 are mutually exclusive. The voltage inertia of the capacitor Creset limits the amplitude of the reset voltage appearing across the magnetizing inductance during the non-conducting interval of MOSFET power switch Q1.

The secondary winding is connected to an output lead through a synchronous rectifier including MOSFET rectifying devices SR1 and SR2. Each rectifying device includes a body diode. With the power switch Q1 conducting, the input voltage is applied across the primary winding. The secondary winding is oriented in polarity to respond to the primary voltage with a current flow through inductor Lo, the load connected to the output lead and back through the MOSFET rectifier device SR1 to the secondary winding. Continuity of the current flow in the inductor Lo when the power switch Q1 is non-conducting is maintained by the current path provided by the conduction of the MOSFET rectifier device SR2. An output filter capacitor Co shunts the output of the converter.

Conductivity of the two rectifier devices SR1 and SR2 is controlled by the gate drive signals provided by the primary PWM (pulse-width modulated) control of switch Q1. The control signal to SR1 and SR2 can be derived from various ways, such as signals coupled from the power transformer T or other mechanisms that carry the primary PWM timing information. PWM includes, for example, an oscillator, a comparator, and a flip-flop. The output of the PWM provides a PWM drive signal.

In order to prevent transformer saturation and excessive heating or failure of the switch Q1 during startup, the PWM drive signal on the primary switch Q1 usually goes through a soft-start process. During a soft-start, the pulse-width of the gate signal to Q1 gradually increases from a very small duty-ratio to its steady-state duty-ratio. Since the drive signal of the freewheeling synchronous rectifier SR2 is by and large complementary to that of primary switch Q1, its duty ratio starts high and gradually reduces over the soft-start process. Consequently, during a startup, especially if the output has a pre-existing voltage (pre-bias) (which could be from other power sources in the system) before the converter starts, the large duty-ratio of SR2 will build a negative current in the output inductor Lo, which may cause the output voltage to drop, and further resulting in disturbance to other voltages that are coupled to this output. This output voltage drop and the disturbance to other voltages may be unacceptable to some of the loads connected to these voltages.

Therefore, it would be desirable to control the drive signal to the rectifier device SR2 during this startup process to address the above problem.

BRIEF SUMMARY OF THE INVENTION

Generally, the present invention fulfills the foregoing needs by providing in one aspect thereof a circuit for controlling switching circuitry in a power converter device during a soft-start process wherein the pulse-width of a gate drive signal to a main switch of the power converter device gradually increases from a minimum duty-ratio to a steady-state duty-ratio. The circuit includes synchronous rectifier control circuitry adapted to gradually apply a gate drive signal to a freewheeling synchronous rectifier of the switching circuitry during the soft-start process by either controlling the amplitude or pulse-width of the gate drive signal to the freewheeling synchronous rectifier.

The synchronous rectifier control circuitry includes gate clamping circuitry. In one aspect of the invention, the gate clamping circuitry includes a diode series coupled to a resistor paralleled to a capacitor to provide voltage clamping of the gate drive signal applied to the freewheeling synchronous rectifier. In another aspect of the invention, the gate clamping circuitry comprises a transistor series coupled to a resistor paralleled to a capacitor to provide voltage clamping of the gate drive signal applied to the freewheeling synchronous rectifier. A diode is optionally series coupled with an emitter or base of the transistor to block the voltage when the freewheeling rectifier is gated low. The common of the gate clamping circuitry may also be coupled to a negative voltage potential. Resistors and capacitors may be provided in the main current path of the gate drive circuit of the synchronous rectifier.

The present invention further fulfills the foregoing needs by providing in another aspect thereof, a method for controlling switching circuitry in a power converter device during a soft-start process wherein the pulse-width of a gate drive signal to a main switch of the power converter device gradually increases from a minimum duty-ratio to a steady-state duty-ratio. The method provides for gradually applying a gate drive signal derived from the main switch of the power converter device to a freewheeling synchronous rectifier of the switching circuitry during the soft-start process by gradually releasing either the amplitude or the pulse-width of the gate drive signal to the freewheeling synchronous rectifier. In an aspect of the invention, the gate drive signal is altered by gate clamping circuitry.

The present invention further fulfills the foregoing needs by providing in another aspect thereof, a power converter device including a primary side and a secondary side electromagnetically coupled to one another through a transformer, the power converter including switching circuitry, soft-start circuitry, and control circuitry. Specifically, the switching circuitry is coupled to the transformer on the secondary side, wherein the switching circuitry includes a first synchronous rectifier device that conducts during the conducting state of the main power switch and a second freewheeling rectifier device that conducts during the non-conducting state of the main power switch; the soft-start circuitry is used to gradually increase the pulse-width of the gate drive signal to the main power switch from a minimum duty-ratio to a steady-state duty-ratio during start-up; and control circuitry is coupled to the gate terminal of the second freewheeling rectifier device to alter the gate signal applied thereto during start-up to modify the time in which the second freewheeling rectifier device conducts during the non-conducting state of the main power switch.

The control circuitry is adapted to gradually release either the amplitude or the pulse-width of the gate drive signal to the freewheeling synchronous rectifier. In an aspect of the invention, the control circuitry comprises gate clamping circuitry such as a diode or a transistor series coupled to a resistor paralleled to a capacitor to provide voltage clamping of the gate drive signal applied to the freewheeling synchronous rectifier. The transistor may further include a diode series coupled with an emitter or base of the transistor to block the voltage when the freewheeling rectifier is gated low. Optionally, the common of the gate clamping circuitry is coupled to a negative voltage potential.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
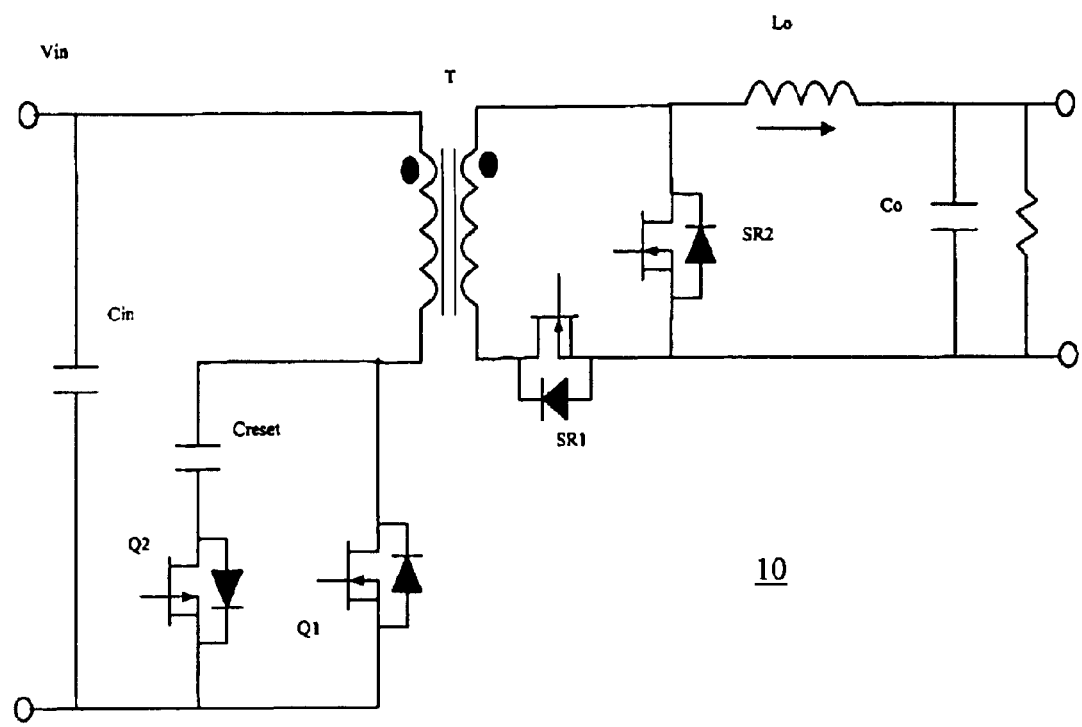
FIG. 1 is a schematic diagram of a basic power converter used in one exemplary forward converter topology that uses a synchronous rectifier.
Figure 2A:
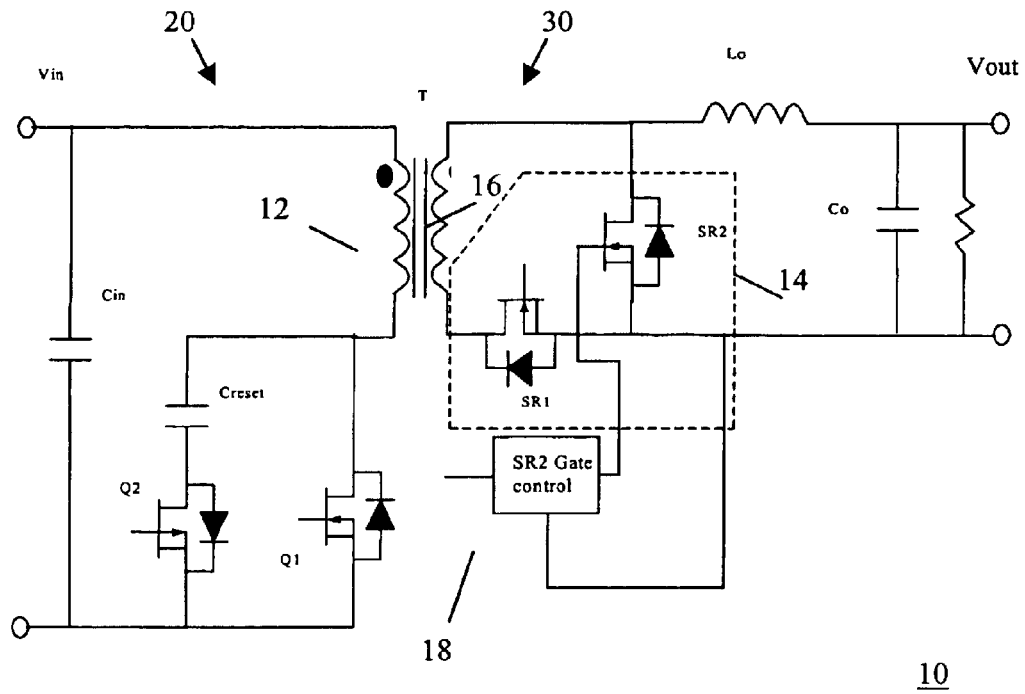
FIGS. 2A–2D illustrates exemplary embodiment of a power converter that in accordance with the aspects of the present invention provides gate control of rectifier device SR2.

FIG. 2A shows a schematic of a power converter 10 embodying aspects of the present invention. Power converter 10 includes a primary section 20 and a secondary section 30 electromagnetically coupled to one another through a transformer T including respective primary and secondary windings, 12 and 16. A DC voltage input Vin is connected to the primary winding 12 of the power transformer by a switch Q1. In one exemplary embodiment, switch Q1 comprises a main power switch, such as an n-channel MOSFET (Metal Oxide Semiconductor Field Effect Transistor) switch. It will be understood, however, that the principles of the present invention are not limited to MOSFET switches since other types of power transistor switches, such as BJTs (Bipolar Junction Transistors), SITs (Static Induction Transistors), IGBTs (Insulated-gate Biploar Transistors), and the like could be used, depending on the requirements in any given application. A clamp circuit arrangement is also provided to limit the reset voltage. The switch Q1 is shunted by a series connection of a clamp capacitor Creset and a switch device Q2. The conducting intervals of Q1 and Q2 are generally mutually exclusive. The voltage inertia of the capacitor Creset limits the amplitude of the reset voltage appearing across the magnetizing inductance during the non-conducting interval of power switch Q1. Generally, the present invention fulfills the foregoing needs by providing in one aspect thereof a power distribution system including a plurality of power converter modules each having a current sharing signal terminal on an input side and power output terminals on an output side, the corresponding power output terminals of the several modules being connected together and adapted to power a common load; an interconnecting signal bus coupled across the current sharing signal terminals on the input side; a plurality of feedback circuits, each of which is associated with one of said modules, each feedback circuit including a comparator (output error amplifier) for comparing a feedback voltage on the output side with a reference voltage to provide an error signal to the input side; the error signal conditioned to provide a current command signal to said signal bus, wherein the signal bus provides a control signal to drive the power converter modules.

The secondary winding 16 is connected to an output lead through a synchronous rectifier 14 including rectifying devices SR1 and SR2. In one aspect of the invention, each rectifying device comprises a MOSFET rectifier device including a body diode. Other types of switches could be used, depending on the requirements in any given application. With the power switch Q1 conducting, the input voltage Vin is applied across the primary winding 12. The secondary winding 16 is oriented in polarity to respond to the primary voltage with a current flow through inductor Lo, the load connected to the output lead and back through the MOSFET rectifier device SR1 to the secondary winding 16. Continuity of the current flow in the inductor Lo when the power switch Q1 is non-conducting is maintained by the current path provided by the conduction of the freewheeling rectifier device SR2 (e.g., MOSFET). An output filter capacitor Co shunts the output of the converter. Gate control circuitry 18 is provided to apply the gate signal to freewheeling rectifier device SR2 in accordance with the invention.

Figure 2B:
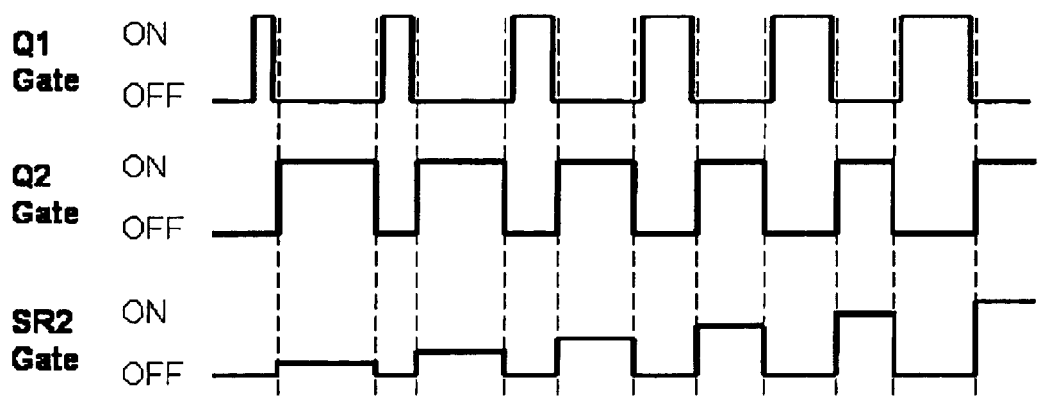
Figure 2C:
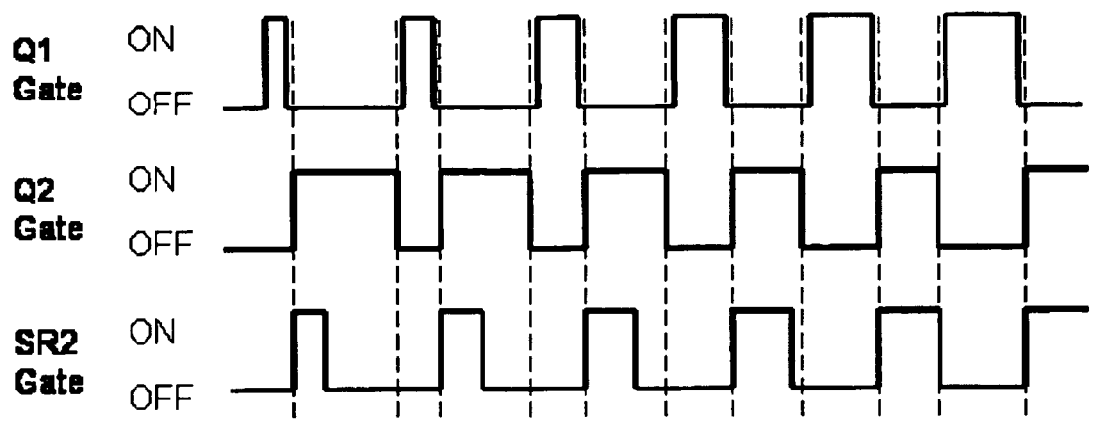
Figure 2D:
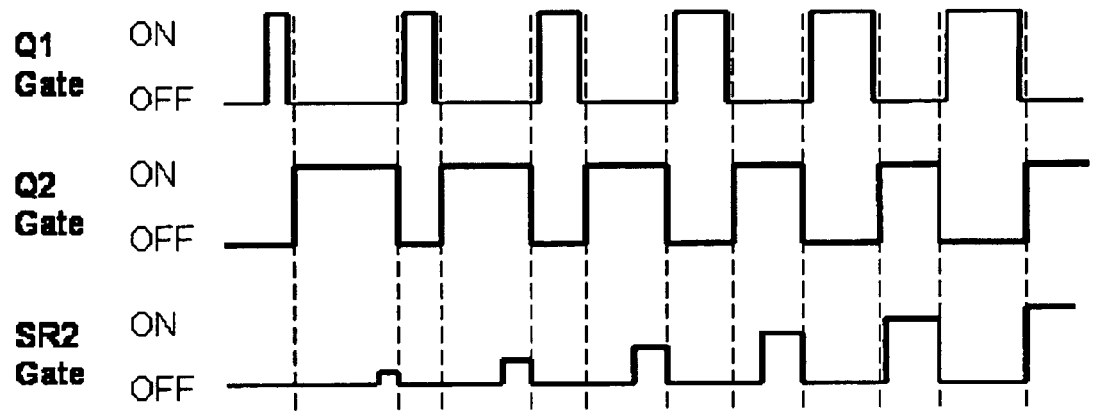

In one aspect of the invention, gate control circuitry 18 is designed to gradually apply the gate signal to the synchronous rectifier SR2 through gradually releasing either the amplitude or the pulse-width of the gate signal to SR2. The speed of releasing the gate signal to SR2 is a parameter determined in accordance with the design requirements of the circuit. Design considerations include the following factors: An abrupt release of the gate signal may introduce a strong disturbance to the converter and cause an unacceptable output voltage transient. A very slow release may cause a few unfavorable problems as well, such as the output voltage may over-shoot under no-load and lose PWM action which could further cause a loss of bias power depending on the detail design. FIGS. 2B–D show exemplary gate drive signals in which the duty cycle, or amplitude, or both duty cycle and amplitude, are shown to be variably used in the clamping action and soft start of SR2.

Figure 3:
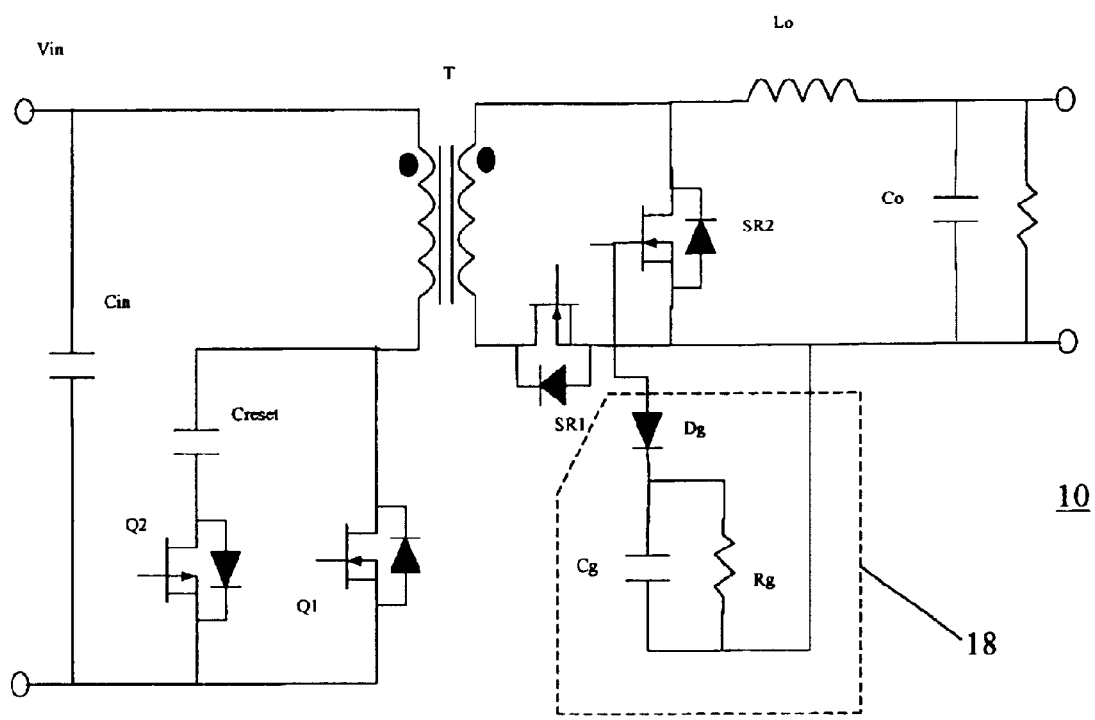
FIG. 3 illustrates another exemplary embodiment of a power converter that in accordance with the aspects of the present invention further provides gate control of rectifier device SR2.

FIG. 3 illustrates an exemplary embodiment of the gate control circuitry 18. The control circuitry 18 is coupled to the drive terminal (gate) of the switch SR2. In this example scheme, the gate control circuitry 18 provides clamping by including a diode and a resistor paralleled to a capacitor (resistor-capacitor-diode (RCD) snubber) which acts as a voltage clamp. The voltage across the capacitor and resistor sets the clamp voltage. Specifically, diode Dg has its anode coupled to the gate of SR2 and its cathode coupled in series to a clamping capacitor Cg and resistor Rg in parallel. This scheme calls for the gate drive circuit be tolerable to a "shorting" of the gate of the synchronous rectifier.

Figure 4:
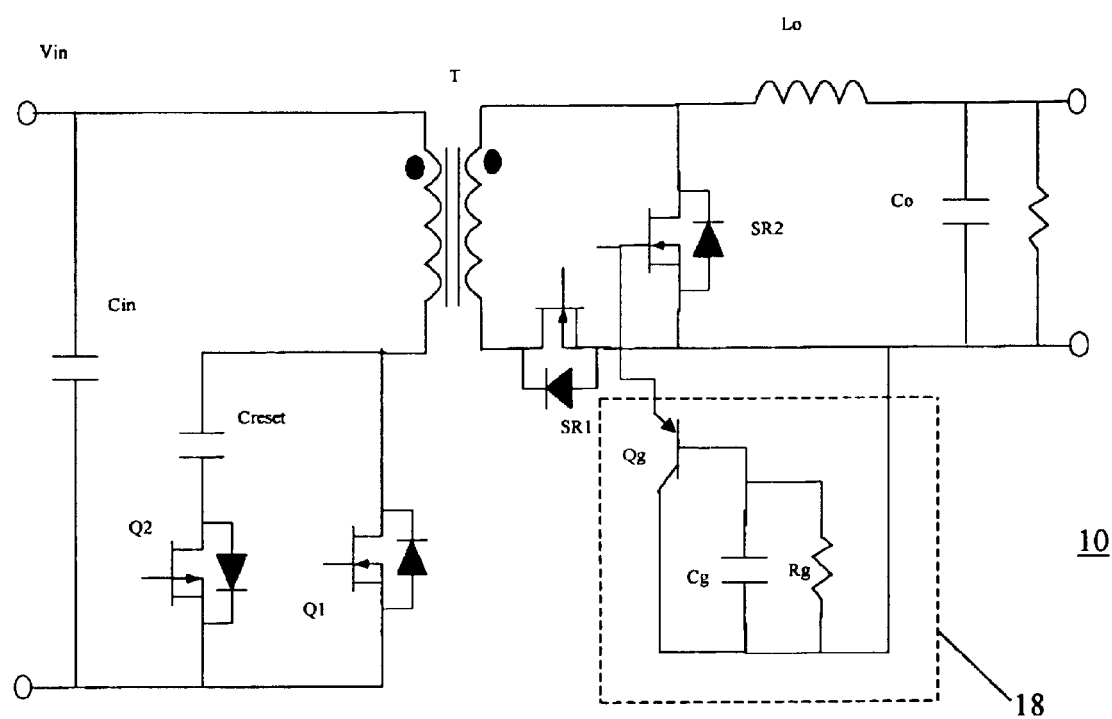
FIG. 4 illustrates another exemplary embodiment of a power converter that in accordance with the aspects of the present invention further provides gate control of rectifier device SR2.

In another implementation, as shown in FIG. 4, to magnify the clamping effect of the capacitor Cg, a transistor Qg replaces the diode Dg of FIG. 3. In one aspect of the invention, transistor Qg comprises a PNP transistor with its emitter coupled to the gate of SR2, its base coupled in series to a capacitor Cg and resistor Rg in parallel. In the event the base-to-emitter reverse blocking voltage of Qg is not sufficient, a diode (not shown) can be added in series with the emitter or the base of Qg to block the voltage when SR2 is off (gated low). The capacitance of Cg, which controls the properties of the clamping effect is selected to obtain desired results.

As the gate threshold voltage of the transistor Qg is moving lower, the emitter-to-base (also the extra diode that may be included) voltage drop could become too large to clamp the gate of SR2 to a sufficiently low level. In that situation, the common of the clamping circuit 18 is moved to a negative voltage potential with reference to the point shown in the figures.

As is apparent to those skilled in the art, the other part of the drive circuits to SR1 and SR2 not shown in the figures can take on various forms. A condition is that the drive circuit for SR2 should be capable of working properly when the gate of SR2 is almost "shorted" to SR2 source for some time during the start-up process. For example, it may include certain impedance, such as a resistor (not shown) or a capacitor (not shown), in its main current path.

While the preferred embodiments of the present invention have been shown and described herein, it will be obvious that such embodiments are provided by way of example only. The overall topology encompasses any topology suitable for synchronous rectification, and is not limited to the topology shown in the illustrated embodiment. Numerous variations, changes and substitutions will occur to those of skill in the art without departing from the invention herein. Accordingly, it is intended that the invention be limited only by the spirit and scope of the appended claims.

What is claimed is:

1. A circuit for controlling switching circuitry in a power converter device during a soft-start process wherein the pulse-width of a gate drive signal to a main switch of the power converter device gradually increases from a minimum duty-ratio to a steady-state duty-ratio, the circuit comprising:

synchronous rectifier control circuitry adapted to gradually apply a gate drive signal to a freewheeling synchronous rectifier of the switching circuitry during the soft-start process.

2. The circuit of claim 1 wherein the control circuitry is adapted to gradually apply the amplitude of the gate drive signal to the freewheeling synchronous rectifier.

3. The circuit of claim 1 wherein the control circuitry is adapted to gradually apply the pulse-width of the gate drive signal to the freewheeling synchronous rectifier.

4. The circuit of claim 1 wherein the synchronous rectifier control circuitry comprises gate clamping circuitry.

5. The circuit of claim 4 wherein the gate clamping circuitry comprises a diode series coupled to a resistor paralleled to a capacitor to provide voltage clamping of the gate drive signal applied to the freewheeling synchronous rectifier.

6. The circuit of claim 4 wherein the gate clamping circuitry comprises a transistor series coupled to a resistor paralleled to a capacitor to provide voltage clamping of the gate drive signal applied to the freewheeling synchronous rectifier.

7. The circuit of claim 6 further comprising a diode series coupled with an emitter of the transistor to block the voltage when the freewheeling rectifier is gated low.

8. The circuit of claim 6 further comprising a diode series coupled with a base of the transistor to block the voltage when the freewheeling rectifier is gated low.

9. The circuit of claim 6 wherein the common of the gate clamping circuitry is coupled to a negative voltage potential.

10. The circuit of claim 4 further comprising a resistor in its synchronous rectifier drive path.

11. The circuit of claim 4 further comprising a capacitor in its synchronous rectifier drive path.

12. A method for controlling switching circuitry in a power converter device during a soft-start process wherein the pulse-width of a gate drive signal to a main switch of the power converter device gradually increases from a minimum duty-ratio to a steady-state duty-ratio, the method comprising:

gradually applying a gate drive signal to a freewheeling synchronous rectifier of the switching circuitry during the soft-start process.

13. The method of claim 12 wherein the gate drive signal is gradually applied by gradually applying the amplitude of the gate drive signal to the freewheeling synchronous rectifier.

14. The method of claim 12 wherein the gate drive signal is gradually applied by gradually applying the pulse-width of the gate drive signal to the freewheeling synchronous rectifier.

15. The method of claim 12 wherein the gate drive signal is altered by gate clamping circuitry.

16. A power converter device comprising
switching circuitry, wherein the switching circuitry comprises a freewheeling synchronous rectifier device that conducts during the non-conducting state of the main power switch;
soft-start circuitry to gradually increase the pulse-width of the gate drive signal to the main power switch from a minimum duty-ratio to a steady-state duty-ratio during start-up;
control circuitry coupled to the gate terminal of the freewheeling rectifier device to alter the gate signal applied thereto during start-up to modify the time in which the freewheeling rectifier device conducts during the non-conducting state of the main power switch.

17. The power converter device of claim 16 wherein the control circuitry is adapted to gradually apply the amplitude of the gate drive signal to the freewheeling synchronous rectifier.

18. The power converter device of claim 16 wherein the control circuitry is adapted to gradually apply the pulse-width of the gate drive signal to the freewheeling synchronous rectifier.

19. The power converter device of claim 16 wherein the control circuitry comprises gate clamping circuitry.

20. The power converter device of claim 19 wherein the gate clamping circuitry comprises a diode series coupled to a resistor paralleled to a capacitor to provide voltage clamping of the gate drive signal applied to the freewheeling synchronous rectifier.

21. The power converter device of claim 19 wherein the gate clamping circuitry comprises a transistor series coupled to a resistor paralleled to a capacitor to provide voltage clamping of the gate drive signal applied to the freewheeling synchronous rectifier.

22. The power converter device of claim 21 further comprising a diode series coupled with an emitter of the transistor to block the voltage when the freewheeling rectifier is gated low.

23. The power converter device of claim 21 further comprising a diode series coupled with a base of the transistor to block the voltage when the freewheeling rectifier is gated low.

24. The power converter device of claim 19 wherein the common of the gate clamping circuitry is coupled to a negative voltage potential.

* * * * *